United States Patent
Lallier

(10) Patent No.: US 9,187,914 B2
(45) Date of Patent: Nov. 17, 2015

(54) ADVANCED STANDING SEAM ROOF PANEL BRACKET

(71) Applicant: Mario Lallier, Winsted, CT (US)

(72) Inventor: Mario Lallier, Winsted, CT (US)

(73) Assignee: Mario Lallier, Winsted, CT (US)

( * ) Notice: Subject to any disclaimer, the term of this patent is extended or adjusted under 35 U.S.C. 154(b) by 148 days.

(21) Appl. No.: 13/898,040

(22) Filed: May 20, 2013

(65) Prior Publication Data

US 2013/0313043 A1 Nov. 28, 2013

Related U.S. Application Data

(63) Continuation-in-part of application No. 12/931,389, filed on Jan. 31, 2011, now abandoned.

(60) Provisional application No. 61/336,995, filed on Jan. 30, 2010, provisional application No. 61/404,474, filed on Oct. 4, 2010.

(51) Int. Cl.
| | |
|---|---|
| *A47G 29/02* | (2006.01) |
| *E04G 3/26* | (2006.01) |
| *E04G 5/04* | (2006.01) |
| *E04G 21/32* | (2006.01) |
| *F24J 2/52* | (2006.01) |

(52) U.S. Cl.
CPC .............. *E04G 3/265* (2013.01); *E04G 5/041* (2013.01); *E04G 21/3285* (2013.01); *F24J 2/5249* (2013.01)

(58) Field of Classification Search
USPC ........... 248/237, 148, 228.3, 228.4; 52/173.3, 52/24, 25, 26; 182/45; 136/244
See application file for complete search history.

(56) References Cited

U.S. PATENT DOCUMENTS

| | | |
|---|---|---|
| 1,054,091 A | 2/1913 | Darnall |
| 1,373,861 A | 4/1921 | Biles |
| 2,729,517 A | 1/1956 | Hamilton, Sr. |
| 3,124,330 A | 3/1964 | Robinson |
| 3,988,952 A | 11/1976 | Dirks |
| 4,546,657 A | 10/1985 | Jaeger |

(Continued)

FOREIGN PATENT DOCUMENTS

| | | |
|---|---|---|
| JP | 2004124583 A | 4/2004 |
| WO | 89/09863 A1 | 10/1989 |

OTHER PUBLICATIONS

International Search Report for corresponding PCT Application No. PCT/US2011/00178 date of completion Mar. 22, 2011.

(Continued)

*Primary Examiner* — Steven Marsh
(74) *Attorney, Agent, or Firm* — MKG LLC

(57) ABSTRACT

A roofing bracket is configured to securely and removeably attach to a standing seam of a roofing panel. The roofing bracket has a first section and a plurality of second sections, each section having a base that defines a top and bottom face. A pressure clamping device extends between the first section and each of the plurality of second sections. A plank support system is selectively mountable onto the first section and configured to receive and retain a plank therein. The plank support system defines a plank support face and an angle lift mechanism configured to place a plank in a substantially horizontal position. A clamping adjustment mechanism is mounted onto each of the plurality of second sections and is configured to apply a torque to the first section and each of the second sections.

17 Claims, 17 Drawing Sheets

(56) References Cited

U.S. PATENT DOCUMENTS

| | | | |
|---|---|---|---|
| 5,125,608 A * | 6/1992 | McMaster et al. | 248/163.1 |
| 5,330,167 A | 7/1994 | Plumb | |
| 5,694,720 A | 12/1997 | Walcher et al. | |
| 6,698,702 B2 | 3/2004 | Macri et al. | |
| 7,036,629 B2 | 5/2006 | Nicolaysen | |
| 7,240,770 B2 | 7/2007 | Mullins et al. | |
| 7,568,671 B2 | 8/2009 | Lallier | |
| 8,025,126 B1 | 9/2011 | Lefavor | |
| 8,070,119 B2 | 12/2011 | Taylor | |
| 8,272,172 B2 | 9/2012 | Li | |
| 8,875,453 B2 * | 11/2014 | Kanczuzewski et al. | 52/173.3 |
| 2003/0217890 A1 | 11/2003 | Nicolaysen | |
| 2006/0179637 A1 | 8/2006 | Schueler | |
| 2012/0032045 A1 | 2/2012 | Lallier et al. | |
| 2012/0085041 A1 * | 4/2012 | Place | 52/173.3 |
| 2013/0133275 A1 * | 5/2013 | Bindschedler et al. | 52/173.3 |

OTHER PUBLICATIONS

International Search Report and Written Opinion for PCT Application No. PCT/US2014/038693, dated Sep. 30, 2014, pp. 1-10.
Extended European Search Report for European Patent Application No. EP 11737417.3-1601/2528482, PCT/US2011000178, dated Dec. 15, 2014, p. 1-4.

* cited by examiner

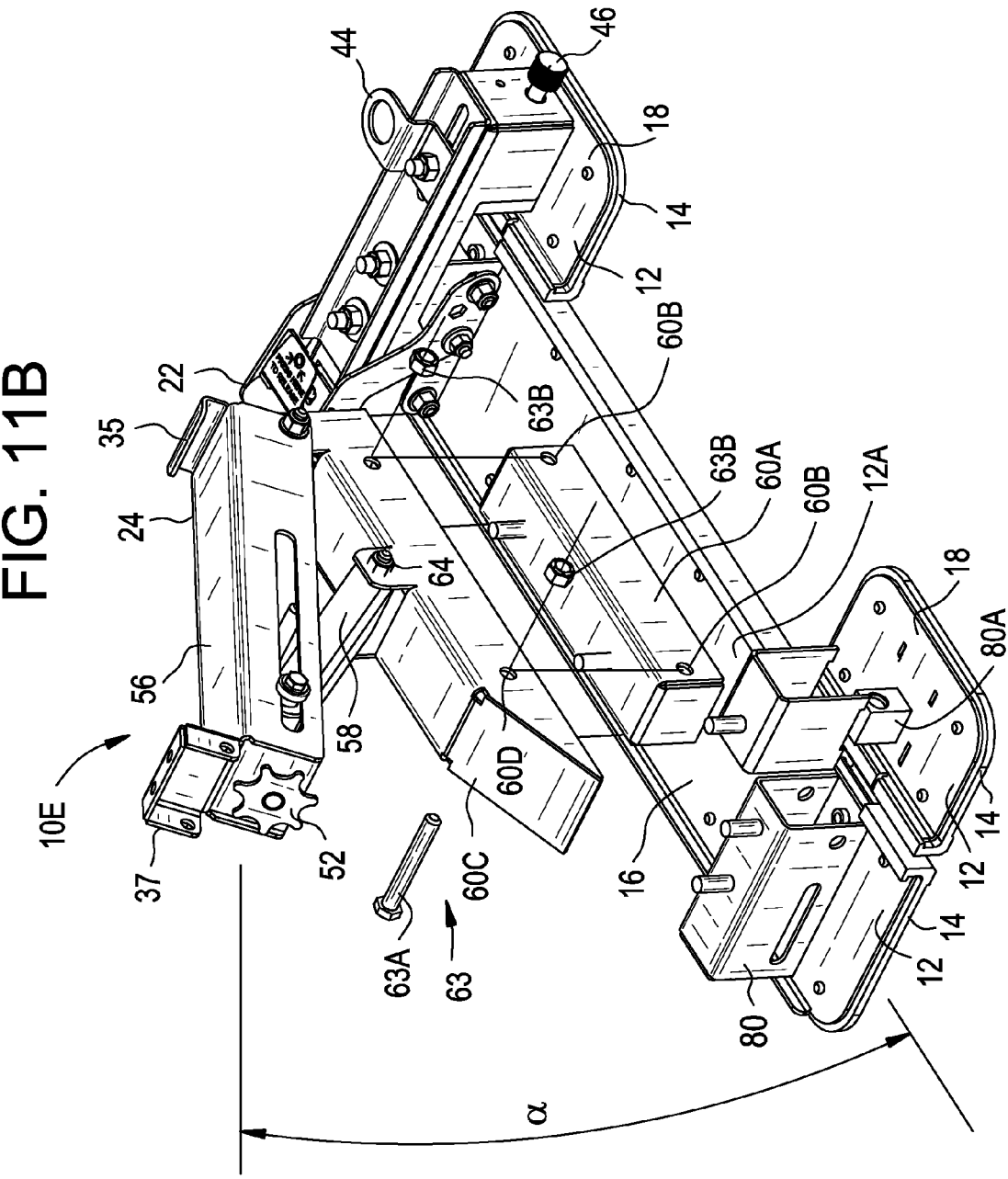

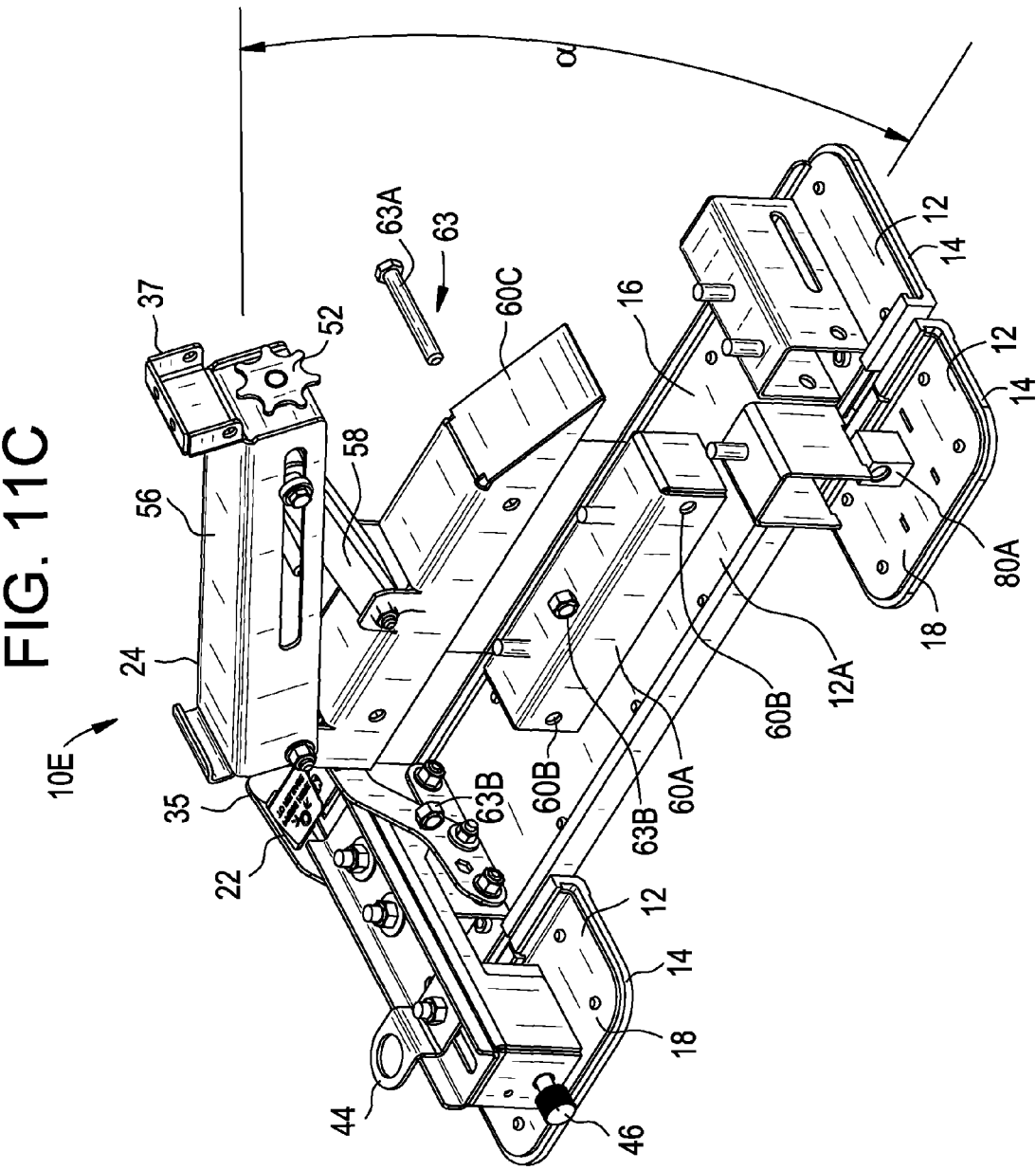

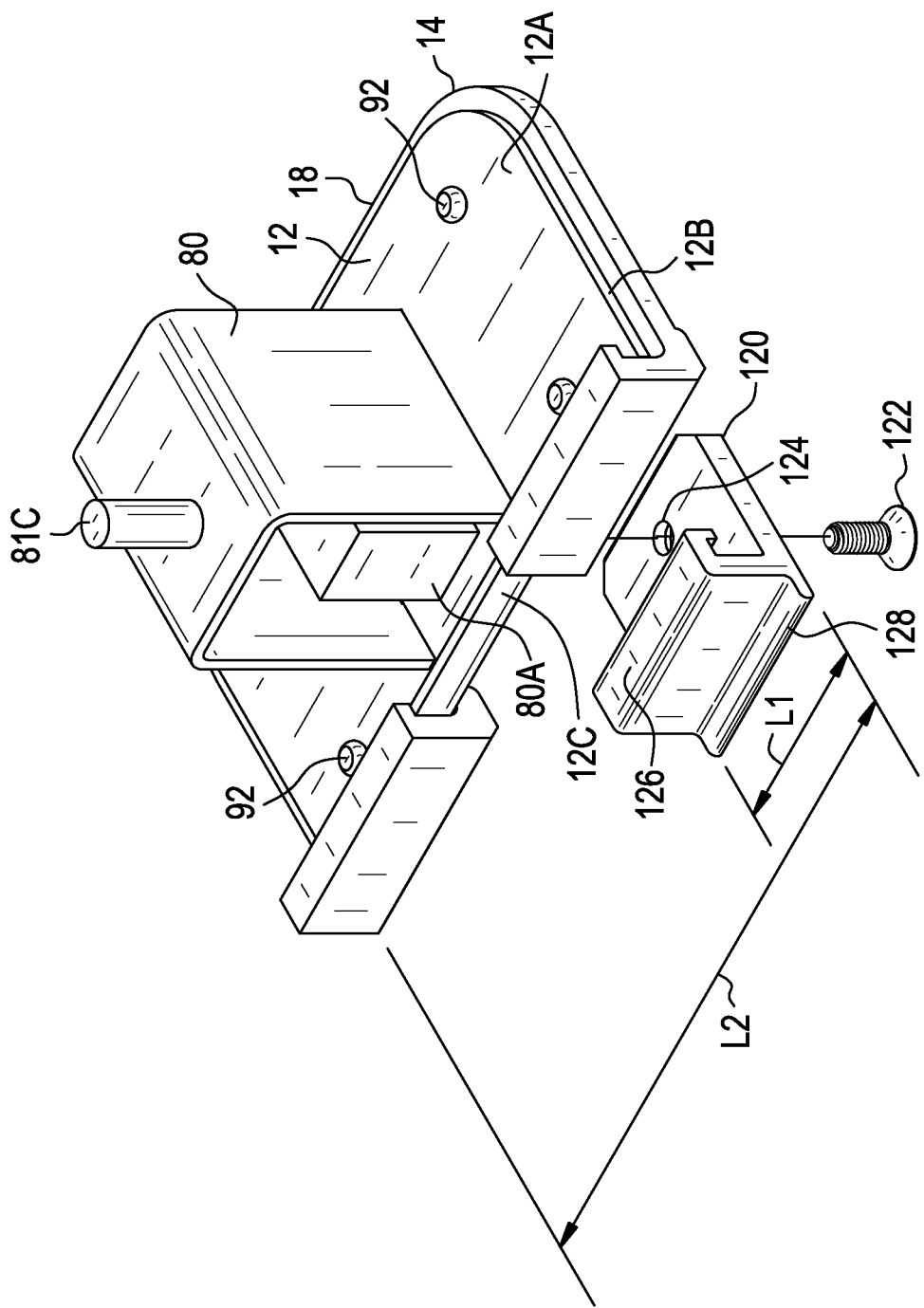

ADVANCED STANDING SEAM ROOF PANEL BRACKET

CROSS REFERENCE

This application is a Continuation-In-Part of U.S. patent application Ser. No. 12/931,389 filed on Jan. 31, 2011; and in turn this application claims the benefit of the earlier filing dates of Provisional Patent Application Ser. No. 61/336,995 filed Jan. 30, 2010, and Provisional Patent Application Ser. No. 61/404,474 filed Oct. 4, 2010.

FIELD OF THE INVENTION

The present invention is generally directed toward an advanced standing seam roof panel bracket that provides for securing apparatus to a standing seam roof panel. In particular, the present invention comprises an advanced means and method for securely and removeably attaching onto a standing seam of a roof panel any safety equipment, roofing installation tooling and scaffolding, roofing repair tooling, or any other equipment that is desired to be removeably secured to the standing seam of a roof panel. More particularly, the present invention comprises (i) a Pressure Clamping Device that provides the means for removeably securing roofing equipment to the standing seam of the roof panel; and (ii) a Plank Support System that provides the means, in cooperation with the Pressure Clamping Device, for removeably securing and retaining a support platform that is capable of supporting a worker thereon.

BACKGROUND OF THE INVENTION

Roofing brackets designed for positioning a platform and supporting a worker thereon are well known in the art of roofing. Typically, a roof is inclined such that a worker cannot safely perform work while standing or maneuvering on the inclined plane of the roof. As is known in the art, roofing brackets are secured to a roof and a platform is positioned and retained in place. A plurality of roofing brackets provide a means for establishing a generally horizontal configuration onto which a plank is removeably attached such that a generally horizontal plane is provided and a worker may be supported in that generally horizontal position. After a particular section of roofing has been installed, the roofing brackets are removed and repositioned to enable the worker to safely reach another section of the roof.

One significant problem with the roofing brackets known in the art, particularly when installing standing seam roof panels, for example a metal roof, is that the roofing brackets are fastened to the roof using nails driven into the roof structure. As is known in the art, the use of nails to temporarily fasten a roofing bracket to the underlying roof structure is incompatible with the installation of standing seam roof panels, such as for example metal roof panels. The nail holes are detrimental to the standing seam roof panel substrate. In addition, when maneuvering equipment on a roof, and up and down one or more ladders, the weight of such equipment is a critical feature. Another critical feature in such a device is the complexity of its use. Preferably, the roofing bracket can be installed with one hand.

SUMMARY OF THE INVENTION

In one aspect, the present invention resides in a roofing bracket configured to securely and removeably attach to a standing seam of a roofing panel. The roofing bracket comprises: a first section having a first section base, the first section base defining a first section base top face and a first section base bottom face; a plurality of second sections, each of the plurality of second sections having a second section base, each second section base defining a second section base top face and a second section base bottom face; a pressure clamping device extending between the first section and each of the plurality of second sections configured to draw together and retain the first section and the respective second section on opposite sides of the standing seam; a plank support system selectively mountable onto the first section and configured to receive and retain a plank therein, the plank support system having a plank support face and an angle lift mechanism, the angle lift mechanism configured to place the plank in a substantially horizontal position; and a clamping adjustment mechanism mounted onto each of the plurality of second sections and configured to apply a torque to the first section and the second section to further draw together the first and second section.

In another aspect, the present invention resides in a method for providing a substantially horizontal platform on an inclined roof. The method comprises: providing at least two roofing brackets, each roofing bracket having a first section, a plurality of second sections, a pressure clamping device extending between the first section and each of the plurality of second sections, a plank support system selectively mountable onto the first section and having a plank support face and an angle lift mechanism, a clamping adjustment mechanism mounted onto each of the plurality of second sections; mounting each roofing bracket to a standing seam of a roofing panel installed on an inclined roof in a substantially horizontal orientation therebetween, the first section and the a plurality of second sections are positioned adjacent to and on opposite sides of the standing seam; mounting a plank to the plank support system of each roofing bracket; engaging each angle lift mechanism such that an angle between a top face of the first section and the plank support face of each roofing bracket is in the range of about 15° to about 75°; and adjusting the clamping adjustment mechanism of each of the plurality of second sections to apply a torque to the first section and the respective second sections of each roofing bracket.

BRIEF DESCRIPTION OF THE DRAWINGS

FIGS. 11B and 11C provide another isometric view of the roofing bracket depicted in FIG. 10A showing the Plank Support Structure reversibly mounted on the roofing bracket.

FIG. 12 provides an isometric view of the roofing bracket of FIG. 10A together with a standing seam profile adapter of the present invention.

DETAILED DESCRIPTION OF THE DRAWINGS

Figure 1:
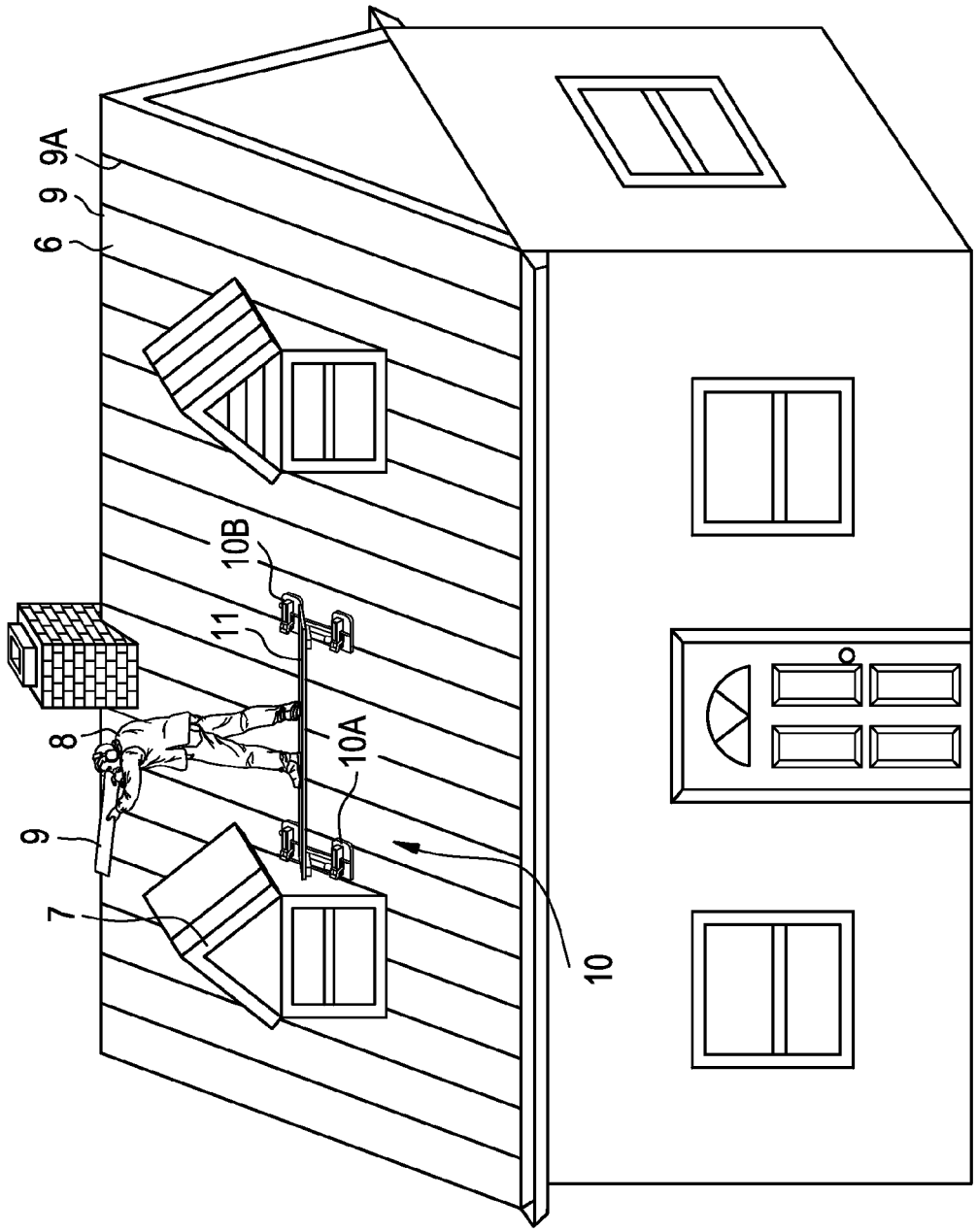
FIG. 1 provides a perspective view of one embodiment of a pair of roofing brackets of the present invention configured to provide a substantially horizontal platform on an inclined roof from which a worker may install roofing panels on a portion of the inclined roof.

One embodiment of a pair of roofing brackets 10A and 10B of the present invention is shown in FIG. 1. Each of the roofing brackets 10A and 10B are mounted to a standing seam 9A of a roofing panel 9 installed on an inclined roof 6 wherein the roofing brackets 10A and 10B have a substantially horizontal orientation in relation to each other. The roofing brackets 10A and 10B provide a substantially horizontal platform 11 on the inclined roof 6 from which a worker 8 may install the roofing panel 9 on a portion 7 of the inclined roof 6.

Figure 2:
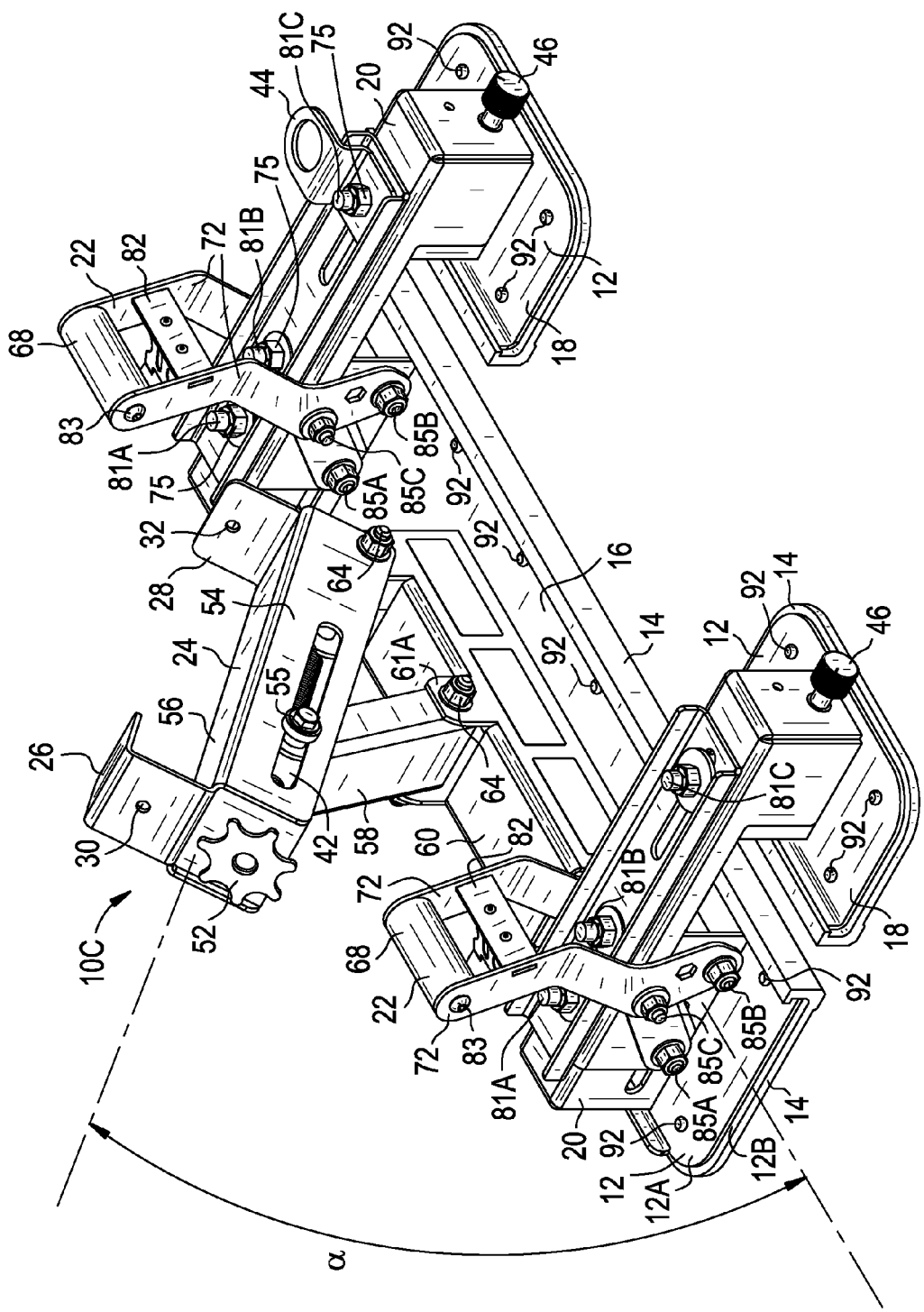
FIG. 2 provides an isometric view of one embodiment of a roofing bracket of the present invention having a Pressure Clamping Device in an unlocked configuration.

As shown in more detail in FIG. 2, a roofing bracket 10C comprises a base 12 having a top face 12A and a bottom face 12B. The base bottom face 12B is configured to be positioned upon a roof panel and proximate to a standing seam of the roof panel. A pad 14 fabricated from rubber or other suitably malleable material is positioned on the base bottom face 12B to protect the finish of the roof panel and standing seam.

In one embodiment, pad 14 is comprised of UV resistant EPDM rubber and is fabricated by an injection molding process. In addition, pad 14 defines a slight vertical or inclined groove to permit rain water or other precipitation to flow therethrough. The base 12 and pad 14 may be joined by any conventional means suited for the materials that comprise the base 12 and pad 14, such as for example a conventional adhesive means for joining an aluminum base to a rubber pad. In one embodiment, pad 14 is joined to base 12 with adhesive and conventional fasteners such as rivets 92.

Roofing bracket 10C is removeably secured to an inclined roof panel whereby the roofing bracket 10C is positioned on a standing seam of a roof panel as further described herein. Roofing bracket 10C defines a first section 16 and one or more second section(s) 18. First section 16 and second sections 18 are positioned adjacent to and on opposite sides of the standing seam of the roofing panel. First section 16 and second sections 18 may be fabricated from a suitable metal such as, for example, steel, aluminum, and titanium. First section 16 and second section 18 also may be fabricated from graphite, wood, or synthetic materials.

Figure 3:
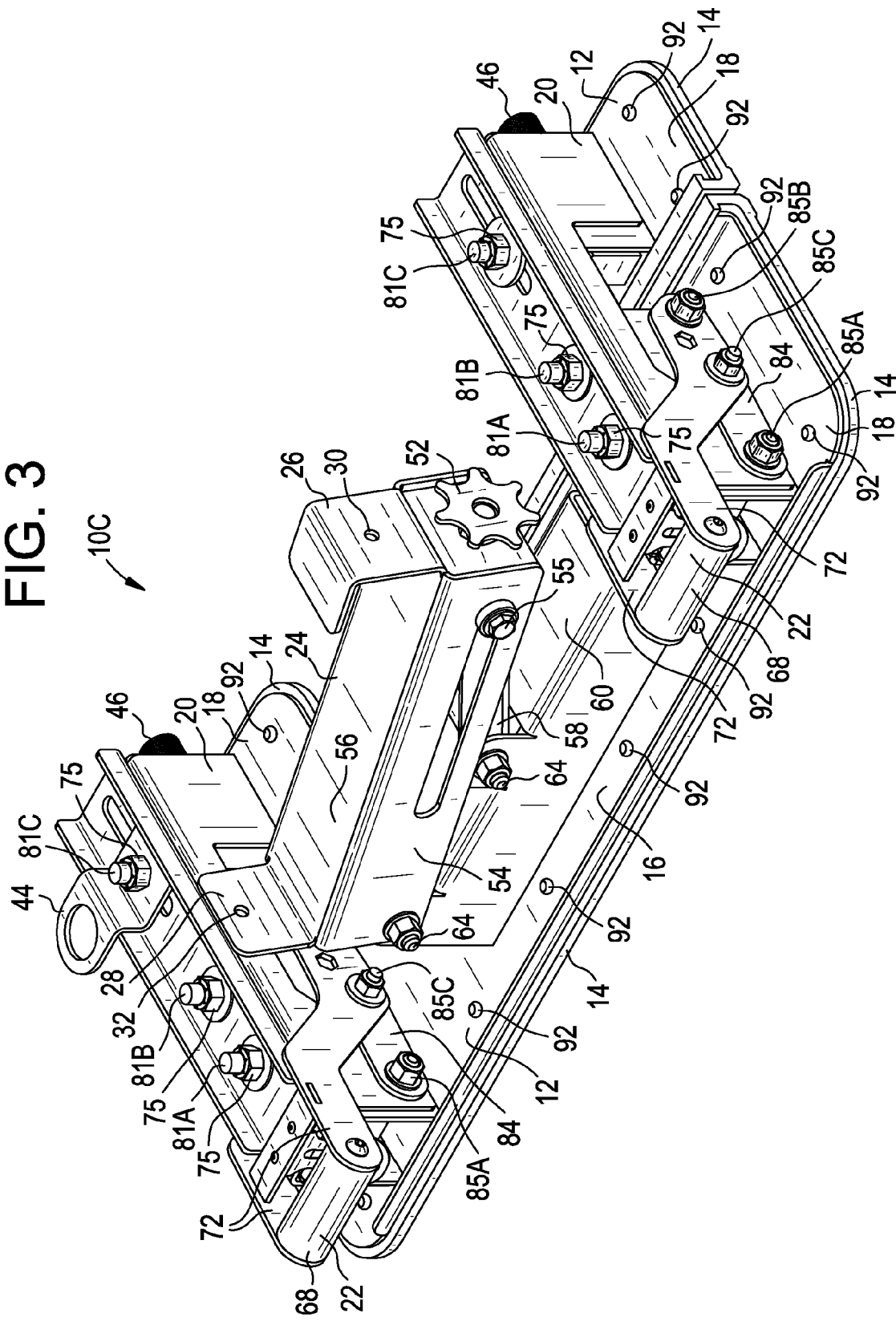
FIG. 3 provides an isometric view of the roofing bracket of FIG. 2 having the Pressure Clamping Device in a locked configuration.

The base 12 of first section 16 supports at least one subframe 20 that, in turn, supports a Pressure Clamping Device ("PCD") 22. In FIG. 2, PCD 22 is shown in an unlocked position; and in FIG. 3, PCD 22 is shown in a locked position. At least one PCD 22 extends between first section 16 and each of the second sections 18 and is configured to draw together and retain first section 16 and respective second section 18 on opposite sides of the standing seam of the roofing panel. Base 12 of first section 16 also supports a Plank Support System ("PSS") 24. In FIG. 3, PSS 24 is shown in an elevated position. In combination, a method for providing a substantially level working platform according to the present invention comprises at least two standing seam roofing brackets as shown in FIG. 1. Each roofing bracket 10C comprises at least one and preferably two PCDs 22 and one PSS 24. A substantially horizontal platform is provided by positioning a plank, comprised of standard robust construction material, between at least two roofing brackets 10C. The plank is positioned on a plank bracket 28 of each roofing bracket 10C. The PSS 24 also comprises one of a variety of support brackets 26. In one embodiment, the plank is secured to PSS 24 by any conventional fastening means which may be passed through an aperture 32 in plank bracket 28 and aperture 30 in support bracket 26. Such a conventional fastening means for securing the plank to the plank brackets may comprise, for example, standard fasteners. In one embodiment, the securing means comprises a plurality of screws (not shown).

In one embodiment, the plank comprises a hardwood 2 in.-×-12 in. plank of sufficient length to span at least two standard standing seams. Alternatively, a hardwood 2 in.-×-8 in. or 2 in.-×-10 in. plank of sufficient length may be used. The selected plank is securely positioned within a respective PSS 24 by positioning the plank onto each respective plank bracket 28 of each roofing bracket 10C. The platform is further secured to PSS 24 by selecting an appropriate support bracket 26 that is secured to the elevated end of PSS 24.

Figure 6:
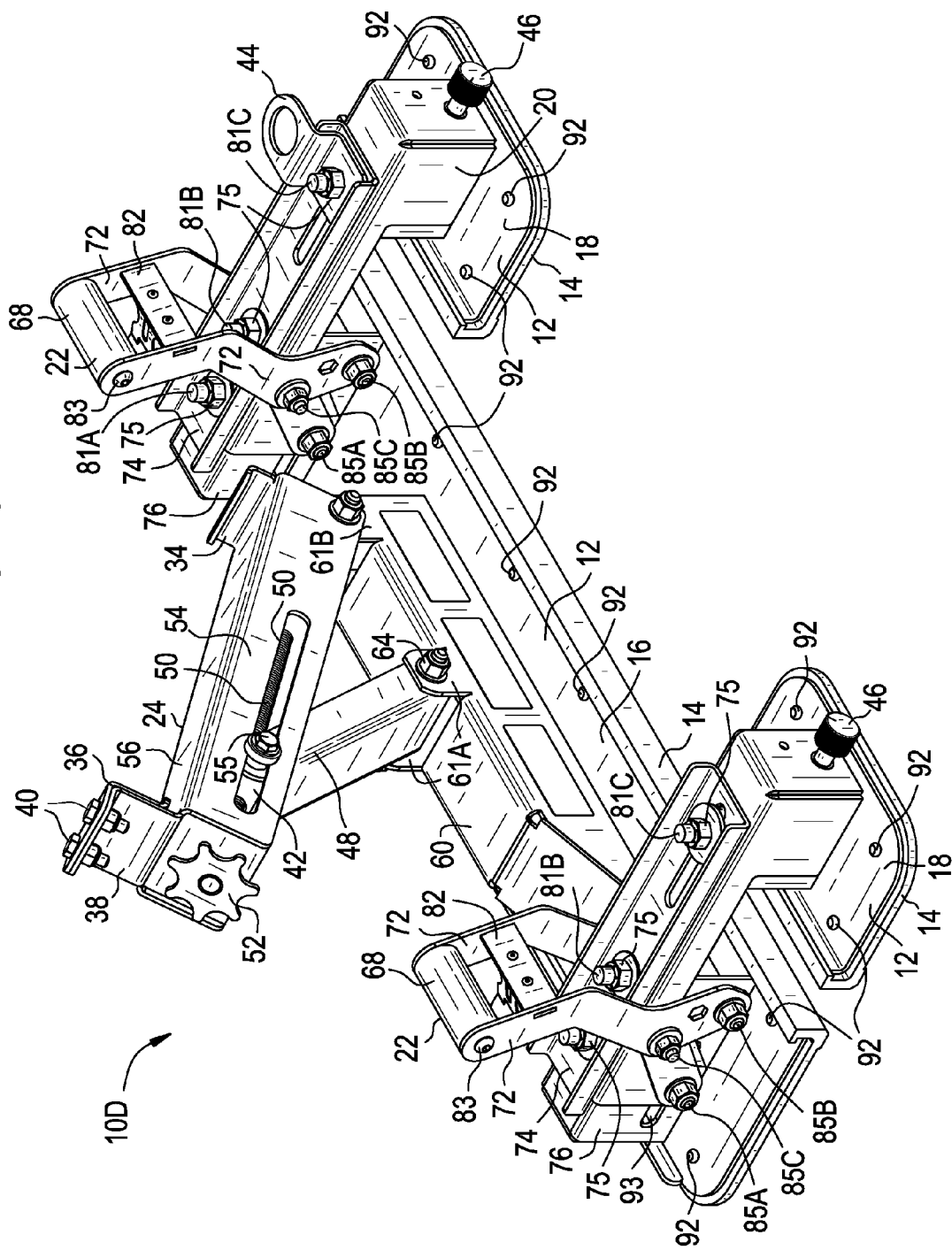
FIG. 6 provides an isometric view of another embodiment of a roofing bracket of the present invention having a Pressure Clamping Device in an unlocked configuration.

Another embodiment of a roofing bracket 10D is shown in FIG. 6. Each roofing bracket 10D comprises at least one and preferably two PCDs 22 and one PSS 24. The plank may be comprised of steel, aluminum, or any other suitably rigid substance. Typically, such a platform comprises less thickness than a hardwood plank. In addition, such a platform may comprise a width of up to 12 in., 14 in., 16 in., or even 24 in. or more. A plank bracket 34 is sized to engage and retain a plank of less width than a hardwood plank, such as, for example, a metal plank. The method for engaging and retaining the metal plank includes selecting one of a variety of support brackets 36 removeably fastened to a plank bracket 38 by any conventional means including conventional fasteners 40 such as bolts and nuts and the like. Roofing bracket 10D is depicted in FIG. 6 in an unlocked position and in FIG. 7 in a locked position.

Figure 4:
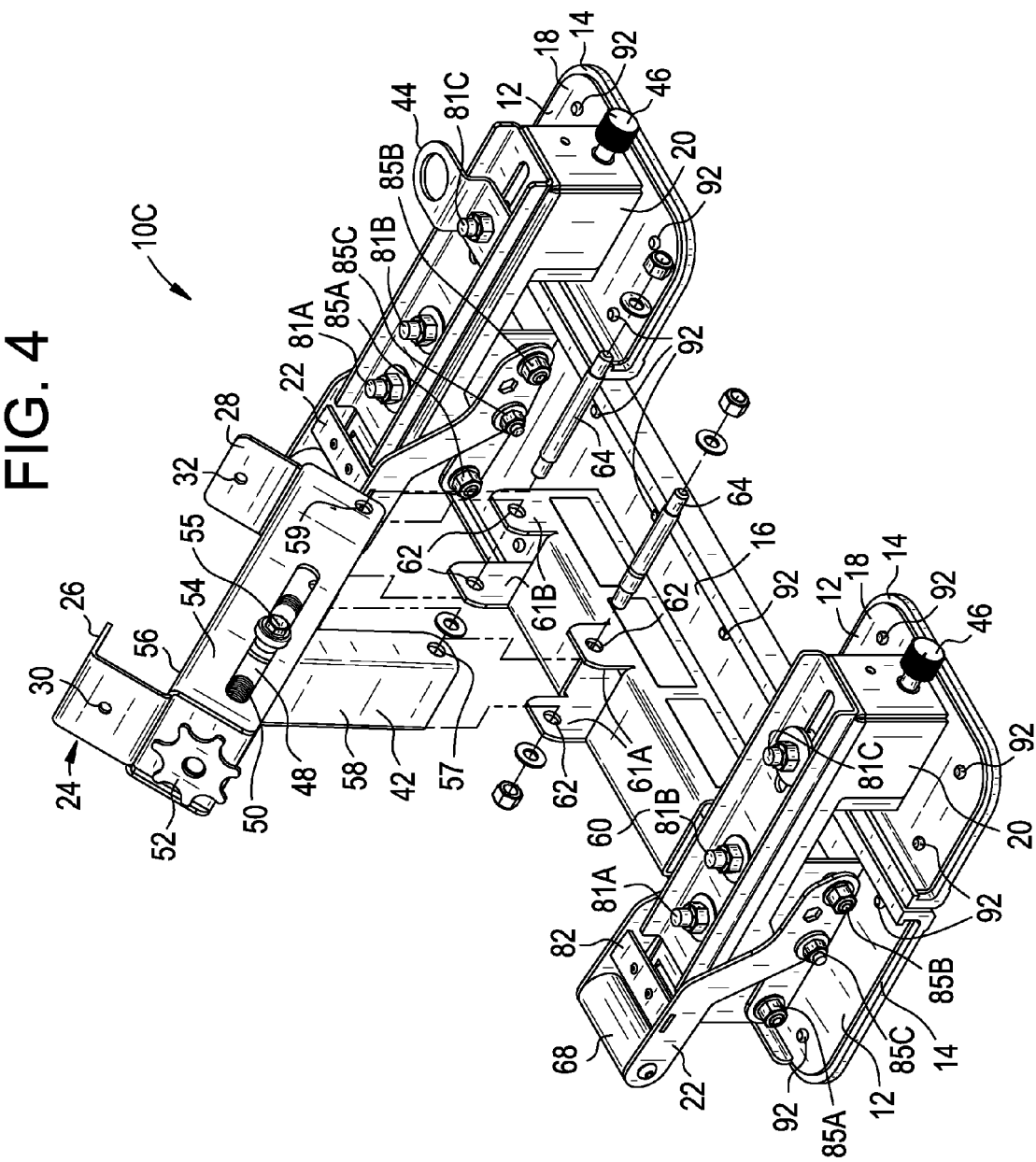
FIG. 4 provides an isometric view of the roofing bracket of FIG. 2 showing a Plank Support System disassembled from the roofing bracket.
Figure 8:
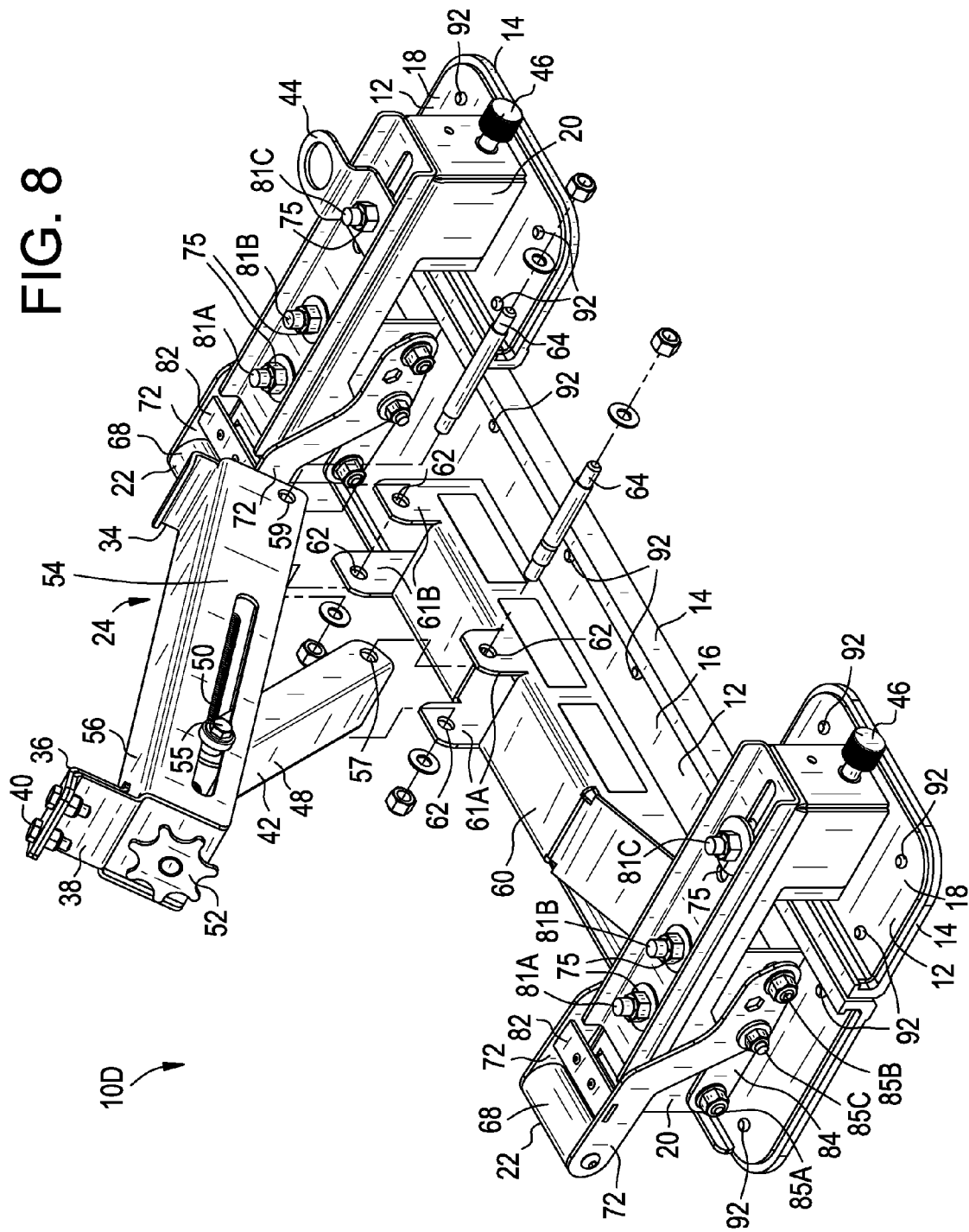
FIG. 8 provides an isometric view of the roofing bracket of FIG. 6 showing a Plank Support System disassembled from the roofing bracket.

As further shown in FIG. 2, PSS 24 comprises a radial extension element 42 for elevating PSS 24 for providing a substantially level working surface. As best shown in FIG. 6, one embodiment of a radial extension element 42 comprises a screw lift mechanism 48 having an angle adjustment screw 50 and a handle 52 that in cooperation provide for angular rotation of PSS 24. FIG. 4 provides an illustration of one embodiment of a PSS 24 that has been disassembled from roofing bracket 10C. The PCDs 22 are shown in a locked position. PSS 24 further comprises PSS subframe 54. A plank support face or top face 56 of PSS subframe 54 provides a surface onto which a plank may be placed and subsequently secured to brackets 26 and 28. Correspondingly, FIG. 8 provides an illustration of PSS 24, disassembled from roofing bracket 10D, wherein PCDs 22 are shown in a locked position and the device comprises plank bracket 34, support bracket 36 removeably fastened to plank bracket 38, and conventional fasteners 40.

As further shown in FIG. 4, extension element 42 comprises an angle lift mechanism or a screw lift mechanism 48 which, in turn, comprises angle adjustment screw 50 and handle 52. These components in cooperation provide for angular rotation of PSS subframe 54. PSS 24 further comprises adjustable subsupport 58 and PSS lower base 60. PSS lower base 60 defines mounting tabs 61A and 61B extending upward from each side of PSS lower base 60 that provide apertures 62 to serve as pivot joints. The upper end of adjustable subsupport 58 is pivotally connected to PSS subframe 54 by conventional means or fasteners 55 that provide for rotation of adjustable subsupport 58 and PSS subframe 54 about such means or fasteners 55.

The lower end of adjustable subsupport 58 provides apertures 57 for pivotally connecting to mounting tabs 61A by conventional means or fasteners, such as a pin assembly 64, that provide for rotation of adjustable subsupport 58 about PSS lower base 60. Lastly, the lower end of PSS subframe 54 provides an aperture 59 that aligns with apertures 62 in mounting tabs 61B such that PSS subframe 54 is pivotally connected to mounting tabs 61B by conventional means or fasteners, such as pin assembly 64, that provide for rotation of adjustable subsupport 58 about PSS lower base 60.

Rotation of handle 52 correspondingly rotates angle adjustment screw 50 whereby adjustable subsupport 58 correspondingly elevates or lowers PSS subframe 54. Concurrently, PSS subframe 54 and adjustable sub support 58 correspondingly rotate about PSS lower base 60 thereby supporting the elevating or lowering of PSS subframe 54. A shown in FIG. 2, an angle $\alpha$ is defined between the base top face 12A of the first section 16 and the PSS top face 56. In one embodiment, angle $\alpha$ is in the range of about 15° to about 75°. In one embodiment, angle $\alpha$ is in the range of about 30° to about 60°. In one embodiment, angle $\alpha$ is in the range of about 45°.

Figure 5:
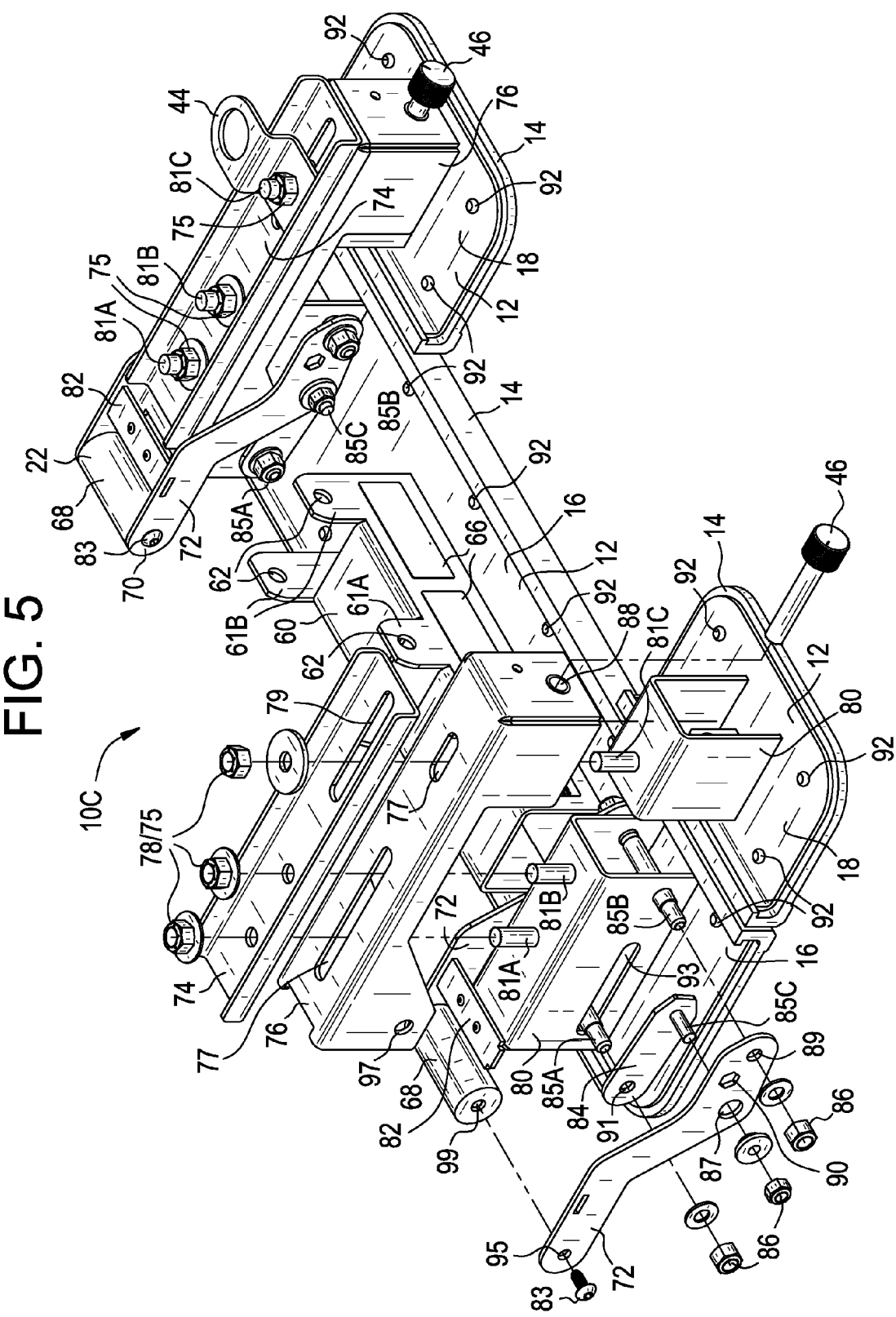
FIG. 5 provides an isometric view of the roofing bracket of FIG. 2 showing the Pressure Clamping Device disassembled from the roofing bracket.
Figure 9:
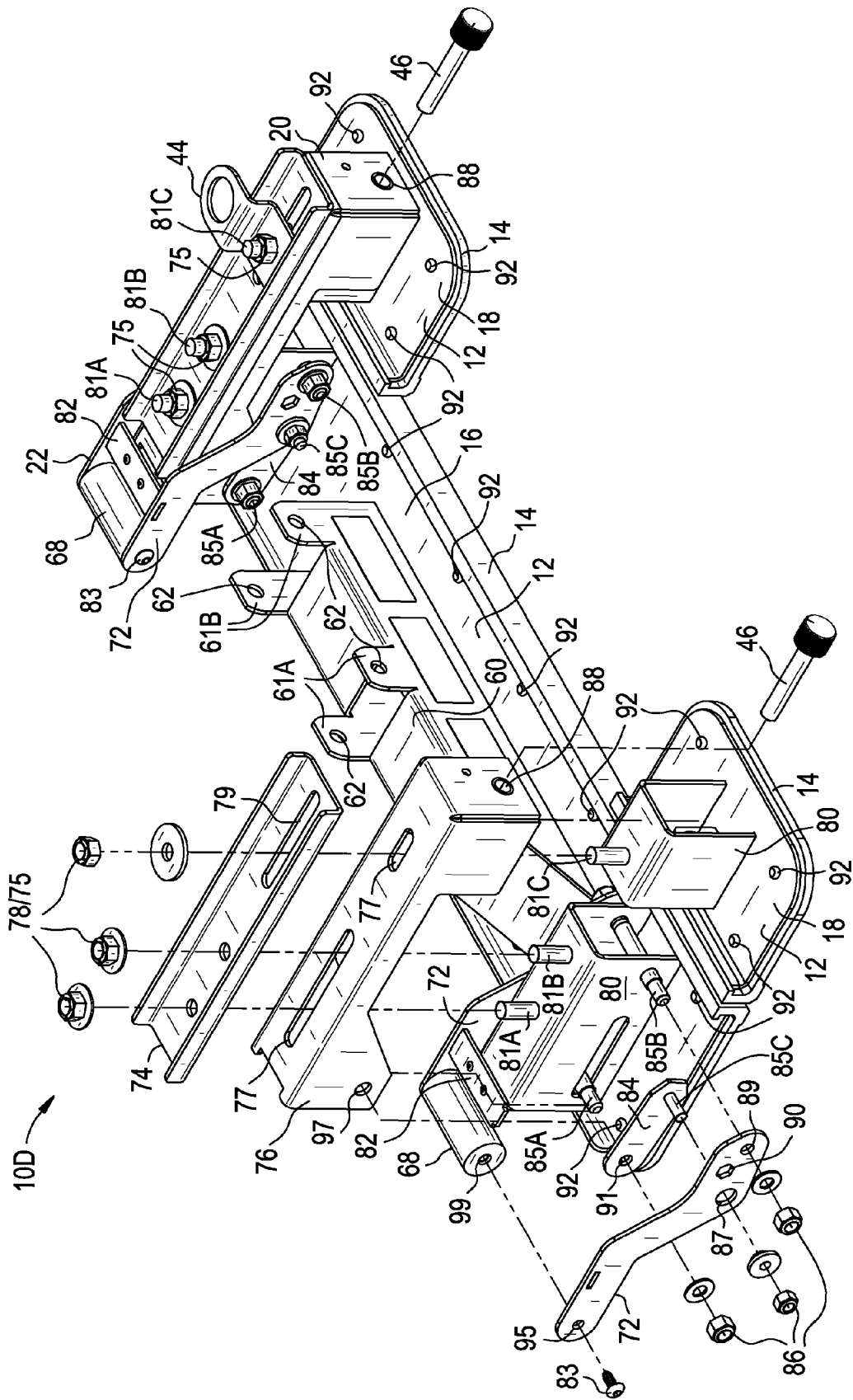
FIG. 9 provides an isometric view of the roofing bracket of FIG. 6 showing the Pressure Clamping Device disassembled from the roofing bracket.

FIG. 5 shows PCD 22 in a disassembled condition. Lever handle assembly 70 comprises gripping element 68, a pair of lever handle brackets 72, and lever handle bracket support 82 to engage and retain gripping element 68 within lever handle assembly 70. As shown, lever handle brackets 72 are secured to gripping element 68 via fasteners 83 that engage an aperture 95 in lever handle bracket 72, and an aperture 99 in gripping element 68. Lever handle assembly 70 further comprises lever handle support 74, lever handle assembly bracket 76, and fastening means 78 such as one or more threaded pins and corresponding locknuts. In addition, lever handle assembly 70 further comprises PCD subframe base 80, locking bracket 84 and left pivot element 85A, right pivot element 85B and center pivot element 85C. Fasteners 86 secure the lever handle brackets 72 to pivot elements 85A, 85B and 85C. Lever handle bracket 72 further provides apertures 87 and 89 that align respectively with pivot elements 85A and 85B. Correspondingly, FIG. 9 provides an illustration of PCD 22 of FIG. 6 disassembled from roofing bracket 10D.

In use and as depicted in FIG. 5, lever support 74 aligns with lever handle assembly bracket 76 that is mounted onto subframe base 80 by fastening means 78 such as for example one or more threaded pins 81A, 81B and 81C and corresponding locknuts 75. Lever handle assembly 70 and pivot elements 85A, 85B and 85C extend over lever handle assembly bracket 76 such that left pivot element 85A engages aperture 91 in locking bracket 84, right pivot element 85B engages aperture 89 in lever handle bracket 72, and center pivot element 85C extending from locking bracket 84 engages aperture 87 in lever handle bracket 72.

The lever handle assembly 70, pivot elements 85A, 85B and 85C, and corresponding subframe base slot 93 are designed such that by pressing the gripping element 68 toward the base 12, the center pivot element 85C mounted on locking bracket 84 pivots lower than the left and right pivot elements 85A and 85B thereby locking the lever handle assembly 70 into place. By pressing the gripping element 68 toward the base 12 and locking it into place, the roofing bracket is pressed tightly against the standing seam of the roof panel and locked into place.

As further illustrated in FIG. 5, tags or labels 66 or the like may be applied to a roofing bracket, for example roofing bracket 10C, thereby providing manufacturing information, instructions for use, or any other suitable information.

As shown in FIGS. 2-9, one embodiment of a roofing bracket 10C or 10D comprises ring bracket 44 removeably and securely mounted onto lever handle assembly 70. Ring bracket 44 provides a means for removeably and securely attaching a lifeline or other safety equipment, a port for a temporary roofing guardrail, a holding mechanism for an upright support, roofing installation or repair tooling, or any other equipment that is desired to be removeably secured to the standing seam of a roof panel.

Figure 7:
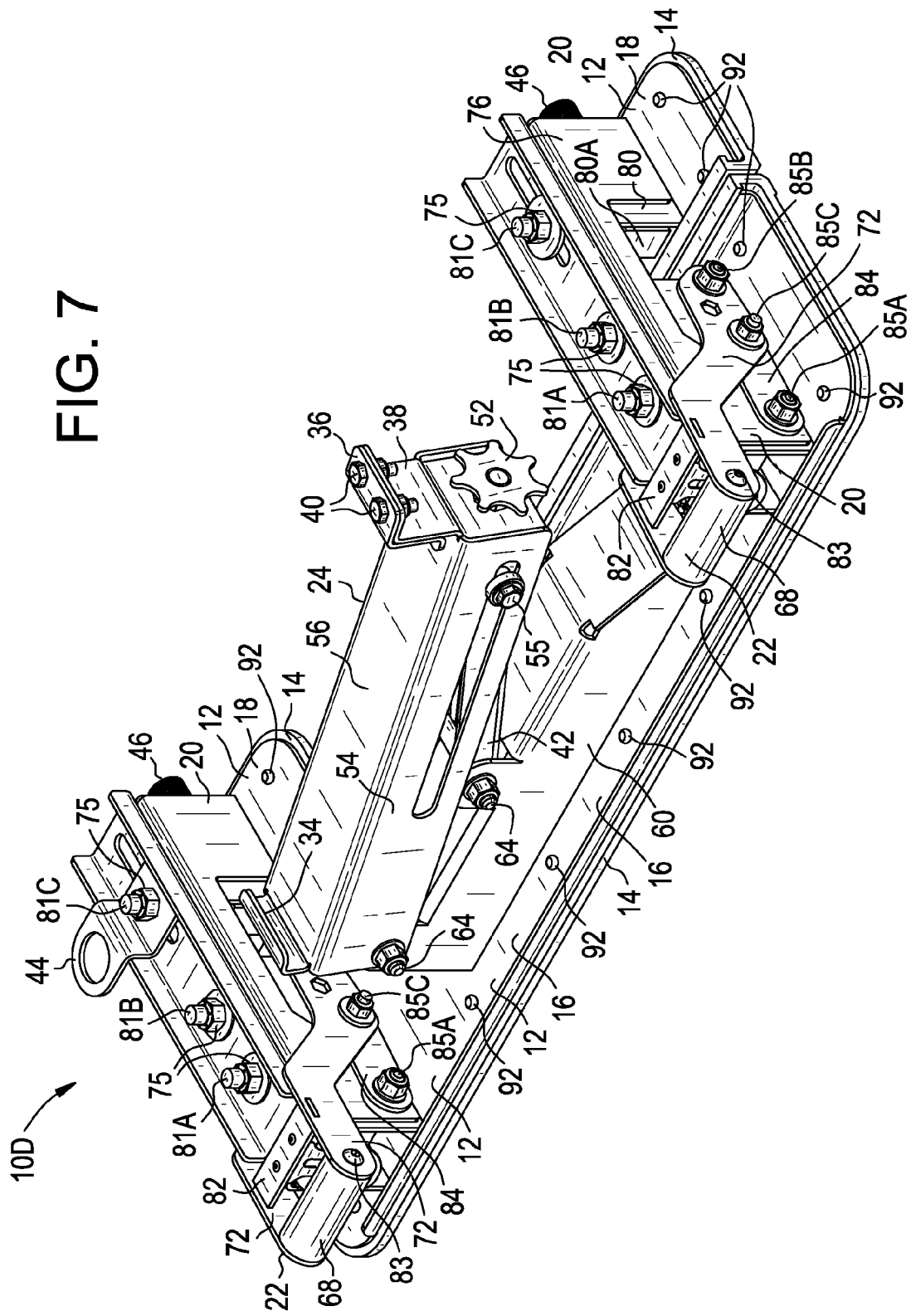
FIG. 7 provides an isometric view of the roofing bracket of FIG. 6 having the Pressure Clamping Device in a locked configuration.
Figure 11A:
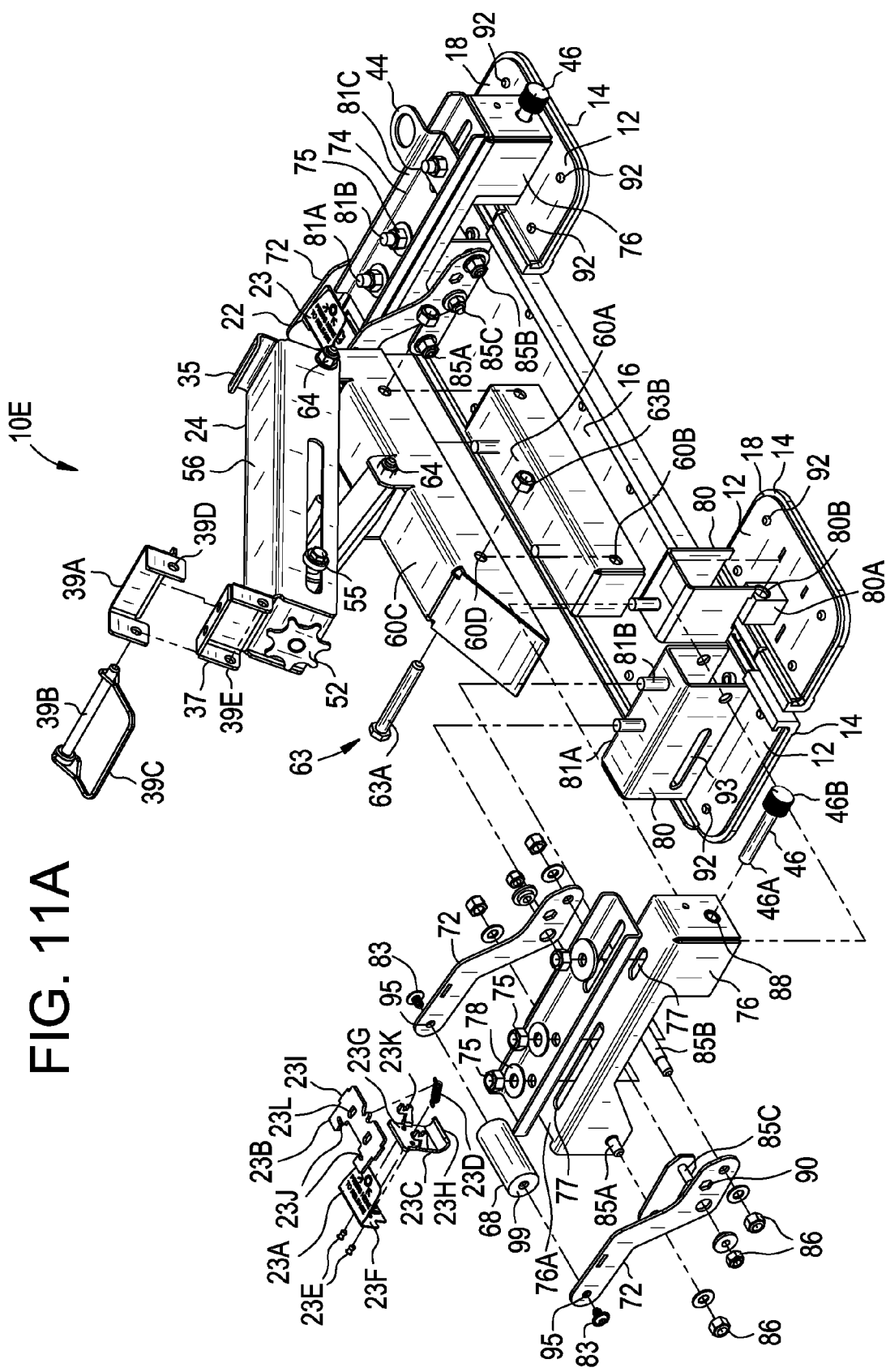
FIG. 11A provides an isometric view of the roofing bracket depicted in FIG. 10A showing the Pressure Clamping Device disassembled from the roofing bracket.

As shown in FIGS. 5, 7 and 11A, one embodiment of roofing bracket 10C comprises a clamping adjustment mechanism including clamping adjustment screw 46 for each clamping device positioned upon a corresponding second section 18. Clamping adjustment screw 46 provides for variability in the thickness of a roof panel standing seam. Clamping adjustment screw 46 engages a clamping adjustment screw receiving aperture 88 defined within the lever handle assembly bracket 76 for engaging an upright section 80A of subframe base 80 positioned on second section 18. (See FIGS. 7 and 11A.) Clamping adjustment screw 46 defines a first end 46A and a second end 46B. In one embodiment, second end 46B comprises a knob having an indicator thereon.

By turning adjustment screw 46 clockwise, first end 46A engages a receiving cavity 80B defined in upright section 80A wherein adjustment screw 46 defines a thread outer diameter greater than an inner diameter of receiving cavity 80B such that an interference fit exists. Accordingly, turning adjustment screw 46 clockwise in turn moves upright section 80A toward the standing seam of the roofing panel thereby increasing the pressure applied on the standing seam by PCD 22. Correspondingly, turning adjustment screw 46 counterclockwise in turn moves upright section 80A away from the standing seam of the roofing panel thereby decreasing the pressure applied on the standing seam by PCD 22. An increase or decrease in pressure applied on the standing seam corresponding to one revolution of adjustment screw 46, as indicated by one revolution of the indicator defined on the second end 46B or knob of adjustment screw 46, can be determined and relied upon when installing roofing bracket 10C or 10D on an inclined roof.

Clamping adjustment screw 46 provides for adjusting the pressure of PCD 22 exerted on the standing seam thereby providing the necessary and appropriate pressure to support the anticipated load. Roofing bracket 10C or 10D is placed upon a standing seam roof panel such that the first section 16 and the second section 18 straddle a standing seam. First section 16 and second sections 18 are clamped loosely on the standing seam panel and each clamping adjustment screw 46 is tightened until each respective pad 14 is snug against the standing seam. First section 16 and second sections 18 are unclamped from the standing seam panel and each clamping adjustment screw 46 is further tightened, for example by one revolution, to ensure an appropriate clamping force is applied when first section 16 and second section 18 are again clamped on the standing seam. Roofing bracket 10C, 10D is disengaged when First section 16 and second section 18 are unclamped from the standing seam panel.

Embodiments of roofing bracket 10C and 10D described above are referred to herein below collectively as roofing bracket 10. In one embodiment, when roofing bracket 10 is installed on the standing seam of a roofing panel, the clamping adjustment mechanism, more particularly the clamping adjustment screw 46, applies a torque to first section 16 and respective second section 18 to further draw together the first and second sections 16 and 18. In one embodiment, the torque applied is in the range between about 20 lbs. and about 50 lbs. of torque per square foot; and more particularly between about 30 lbs. and about 35 lbs. of torque per square foot. Roofing bracket 10 uniquely comprises a method for measuring such torque.

One process for measuring torque requires a standard hexagonal socket, for example a ⅜ inch Allen socket, placed onto a torque wrench. Roofing bracket 10 is securely clamped onto the standing seam. As best shown in FIG. 5, lever handle assembly 70 defines aperture 90 positioned proximate to base 12. Preferably, aperture 90 defines a hexagonal perimeter or a configuration in the shape of the Allen socket. The Allen socket is placed in aperture 90 and the torque wrench is applied to the Allen socket thereby measuring the torque per square foot. This process should be repeated until the torque per square foot measures within the target range.

Roofing bracket 10 provides a generally horizontal working surface or scaffolding, adjusting from a 3/12 slope to a 24/12 slope, and it can be adjusted one degree at a time. In one embodiment, roofing bracket 10 comprises a high grade powder coating to prevent rust. Roofing bracket 10 provides for quick installation and removal, and is easily installed with one hand. In one embodiment, roofing bracket 10 is 300 lbs. rated, wet or dry. Moreover, roofing bracket 10 provides proper fall-arrest systems and tie downs.

Figure 10C:
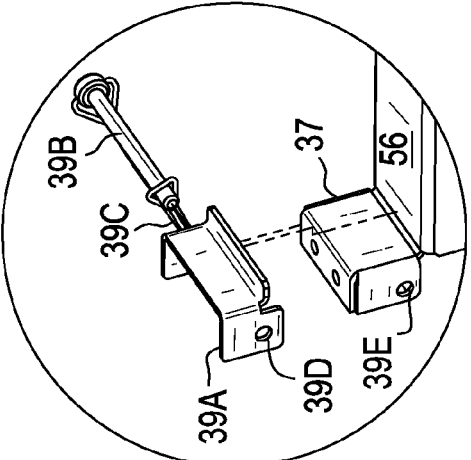
FIG. 10C provides an isometric view of a breakout of the portion of the roofing bracket of FIG. 10B.
Figure 10B:
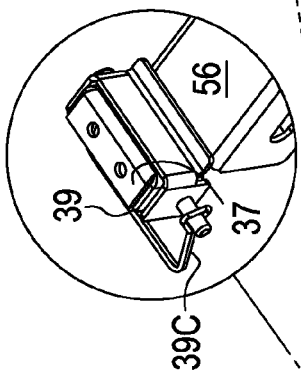
FIG. 10B provides an isometric view of a portion of the roofing bracket of FIG. 10A.
Figure 10A:
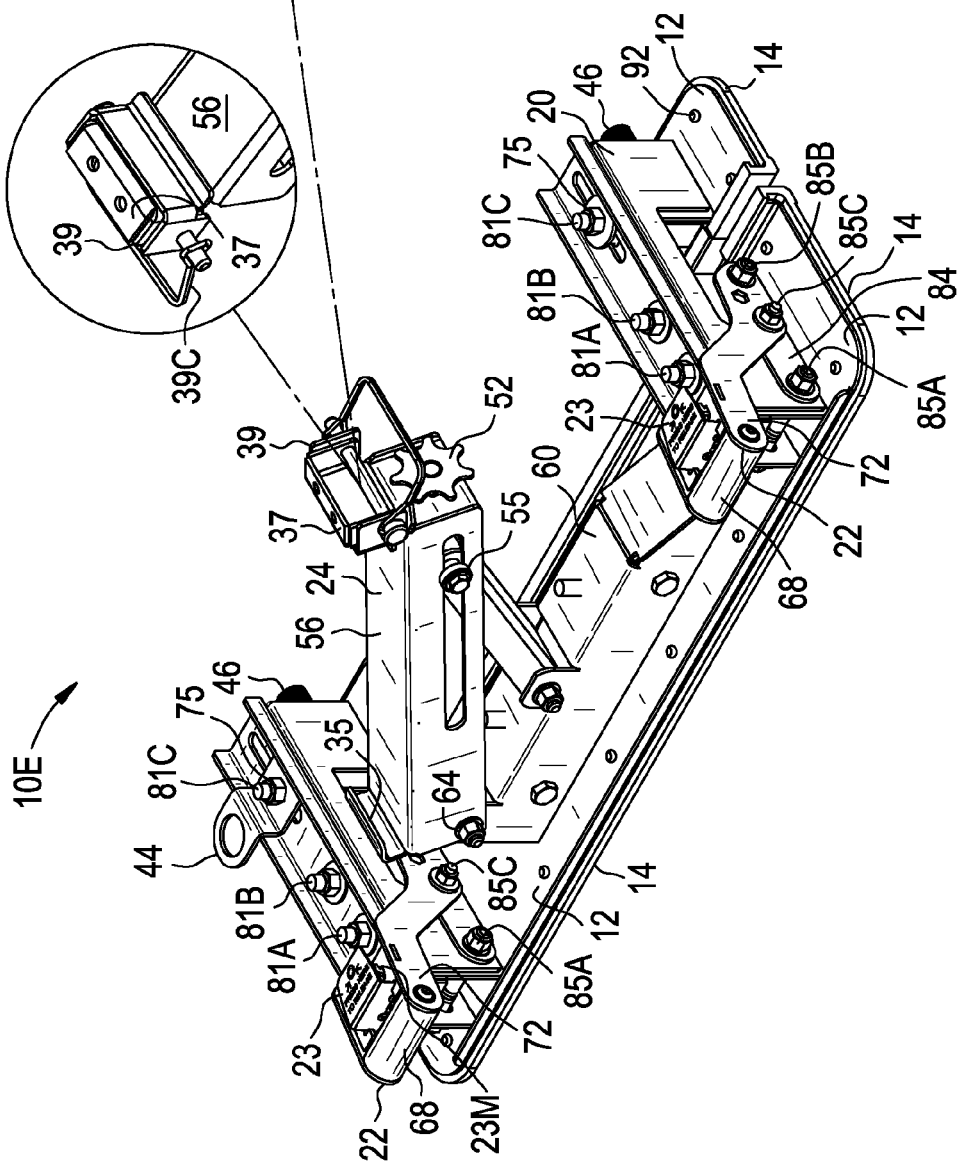
FIG. 10A provides an isometric view of another embodiment of a roofing bracket of the present invention.

Additional embodiments of a roofing bracket 10E are shown in FIGS. 10A-10C. In one embodiment, PSS 24 comprises a plank bracket 35 and support bracket 37. Support bracket 37 provides an anchor for a handle assembly 39 which in turn comprises a support bracket 39A and a pin 39B having a handle 39C mounted thereon. Pin 39B is received in apertures 39D of support bracket 39A and apertures 39E of support bracket 37 to releasably secure handle assembly 39 to PSS 24.

As shown in FIGS. 10A and 11A, PCD 22 comprises a locking tab 23 which in turn comprises a locking flange 23A, a locking clasp 23B, and a locking link 23C. A spring 23D extends between locking clasp 23B and locking link 23C. Locking flange 23A is mounted on locking link 23C via rivets 23E positioned within apertures 23F of locking flange 23A and corresponding apertures 23G of locking link 23C. Mounting tabs 23I extend from locking clasp 23B and are received with corresponding apertures defined in lever handle brackets 72 such that locking clasp 23B is between lever handle brackets 72 when gripping element 68 is secured therebetween with fasteners 83 as described above. Locking link 23C is received within slots 23J defined in locking clasp 23B such that locking link 23C is retained within locking clasp 23B in a substantially perpendicular configuration. Flanges 23K extend from locking link 23C and are lockingly received within corresponding keyways 23L defined in locking clasp 23B such that at a point of contact of each flange 23K with a respective keyway 23L, a pivot point 23M (FIG. 10A) is defined wherein locking flange 23A and locking clasp 23B rotate about such pivot points 23M when locking tab 23 is engaged.

When gripping element 68 is pressed toward base 12 to place PCD 22 in a locked configuration, locking flange 23A and locking clasp 23B rotate about pivot points 23M and a hook portion or hook 23H extending from locking link 23C toward base 12 engages an edge or lip 76A of lever handle assembly bracket 76 thereby further placing PCD 22 in a locked configuration. Spring 23D is in compression such that hook 23H of locking link 23C is biased to engage lip 76A of lever handle assembly bracket 76. By pressing locking flange 23A toward the base 12, hook 23H is disengaged from lip 76A of lever handle assembly bracket 76 thereby providing for release of gripping element 68 which in turn places PCD 22 in an unlocked configuration.

As described above with reference to FIGS. 2-4, and also as shown in FIGS. 6-8, 10A and 11A, a substantially horizontal platform is provided by extending a plank between at least two roofing brackets 10 and mounting the plank onto a PSS 24 of each roofing bracket 10. As shown, for example in FIG. 11A, roofing bracket 10E is configured for mounting onto a standing seam of a roofing panel such that, when facing the inclined roof, first section 16 is positioned adjacent to a left side of the standing seam and second sections 18 are positioned adjacent to a right side of the standing seam. As further shown in FIGS. 11B and 11C, in one embodiment, PSS 24 is selectively mountable onto first section 16 of one roofing bracket 10E such that first and section sections 18 may be mounted on either side of a standing seam while providing a substantially horizontal surface in cooperation with another roofing bracket 10E.

For example, as shown in FIG. 11B, when facing the inclined roof, first section 16 is positioned adjacent to the left side of the standing seam and second sections 18 are positioned adjacent the right side of the standing seam. PSS 24 is adjusted to provide a substantially horizontal surface as described above with reference to FIGS. 2-4, and the angle α is defined between the base top face 12A of the first section 16 and the PSS top face 56. PSS lower base 60 defines a first lower base section 60A fixedly mounted onto the first section 16 and having apertures 60A therein for receiving a fastener 63 therethrough. PSS lower base 60 defines a second lower base section 60C having apertures 60D therein and corresponding to apertures 60A for respectively receiving the fastener 63 therethrough. Second lower base section 60C is selectively mounted onto first lower base section 60A such that the angle α is defined between the base top face 12A of the first section 16 and the PSS top face 56. In one embodiment, fastener 63 comprises a bolt 63A and a nut 63B. While fastener 63 has been shown and described as comprising a bolt 63A and a nut 63B, the present invention is not limited in this regard as other fasteners, such as for example a clevis pin or other pin device, rod or link can be employed without departing from the broader aspects of the present invention.

Alternatively and as shown in FIG. 11C, when facing the inclined roof, first section 16 is positioned adjacent to the right side of the standing seam and second sections 18 are positioned adjacent the left side of the standing seam. Again, PSS 24 is adjusted to provide a substantially horizontal surface as described above with reference to FIGS. 2-4, and the equivalent angle α is defined between the base top face 12A of the first section 16 and the PSS top face 56. The fastener 63 is removed, second lower base section 60C is lifted off of first lower base section 60A and rotated 180° in relation thereto, and again selectively mounted onto first lower base section 60A such that the angle α is defined between the base top face 12A of the first section 16 and the PSS top face 56. As such, roofing bracket 10E is configured for use on a portion of the inclined roof having a roofing panel installed thereon, defining a standing seam to-standing seam (or standing seam-to-obstruction) distance that is less than a width of first section 16 and greater than a width of second section 18 of the roofing bracket.

The first section 16 and second sections 18 of roofing bracket 10 (10C in FIG. 2, 10D in FIG. 6, 10E in FIG. 10A) are configured to engage a standing seam of a roofing panel wherein the standing seam defines a profile cross-section having sides that extend substantially vertical, or upright, and substantially parallel to one another, for example, one of the embodiments of roofing panel profile cross-sections shown respectively in FIGS. 14A-14D. Such standing seams provide an adequate contact area between the first and/or second sections 16 and 18 wherein the first and/or second sections 16 and 18, when properly mounted thereon, do not pull away or slide off of the standing seam. In one embodiment shown in FIG. 14A, a roofing material 150 defines a first piece or section 151 and a second piece or section 153 that are brought together and joined to form a standing seam 155. The standing seam defines opposite sides 152 and 154 that extend substantially vertical and are configured substantially parallel to one another. Opposite sides 152 and 154 provide an adequate contact area such that the first and/or second sections 16 and 18, when properly mounted thereon, do not pull away or slide off of the standing seam 150.

Figure 14A:
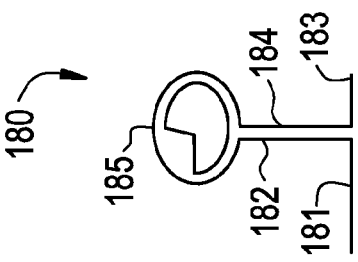
FIGS. 14A-14D provides an illustration of various profiles of a standing seam roof panel.
Figure 14B:
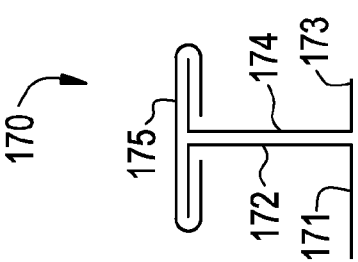
Figure 14C:
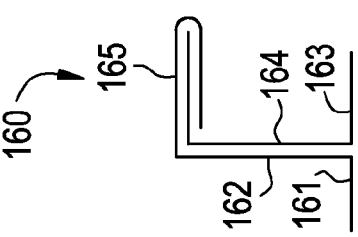
Figure 14D:
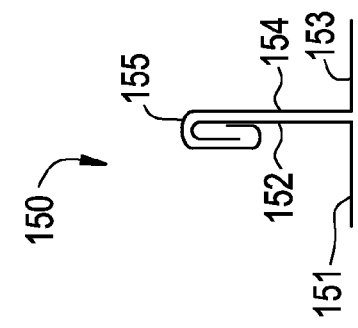

In another embodiment shown in FIG. 14B, a roofing material 160 defines a first piece 161 and a second piece or 163 that form a standing seam 165 having opposite sides 162 and 164 that extend substantially vertical and are configured substantially parallel to one another. Opposite sides 162 and 164 provide an adequate contact area such that the first and/or second sections 16 and 18, when properly mounted thereon, do not pull away or slide off of the standing seam 160. In yet another embodiment shown in FIG. 14C, a roofing material 170 defines a first piece 171 and a second piece or 173 that form a standing seam 175 having opposite sides 172 and 174 that extend substantially vertical and are configured substantially parallel to one another. Opposite sides 172 and 174 provide an adequate contact area such that the first and/or second sections 16 and 18, when properly mounted thereon, do not pull away or slide off of the standing seam 170. In yet another embodiment shown in FIG. 14D, a roofing material 180 defines a first piece 181 and a second piece or 183 that form a standing seam 185 having opposite sides 182 and 184 that extend substantially vertical and are configured substantially parallel to one another. Opposite sides 182 and 184 provide an adequate contact area such that the first and/or second sections 16 and 18, when properly mounted thereon, do not pull away or slide off of the standing seam 180.

Figure 13:
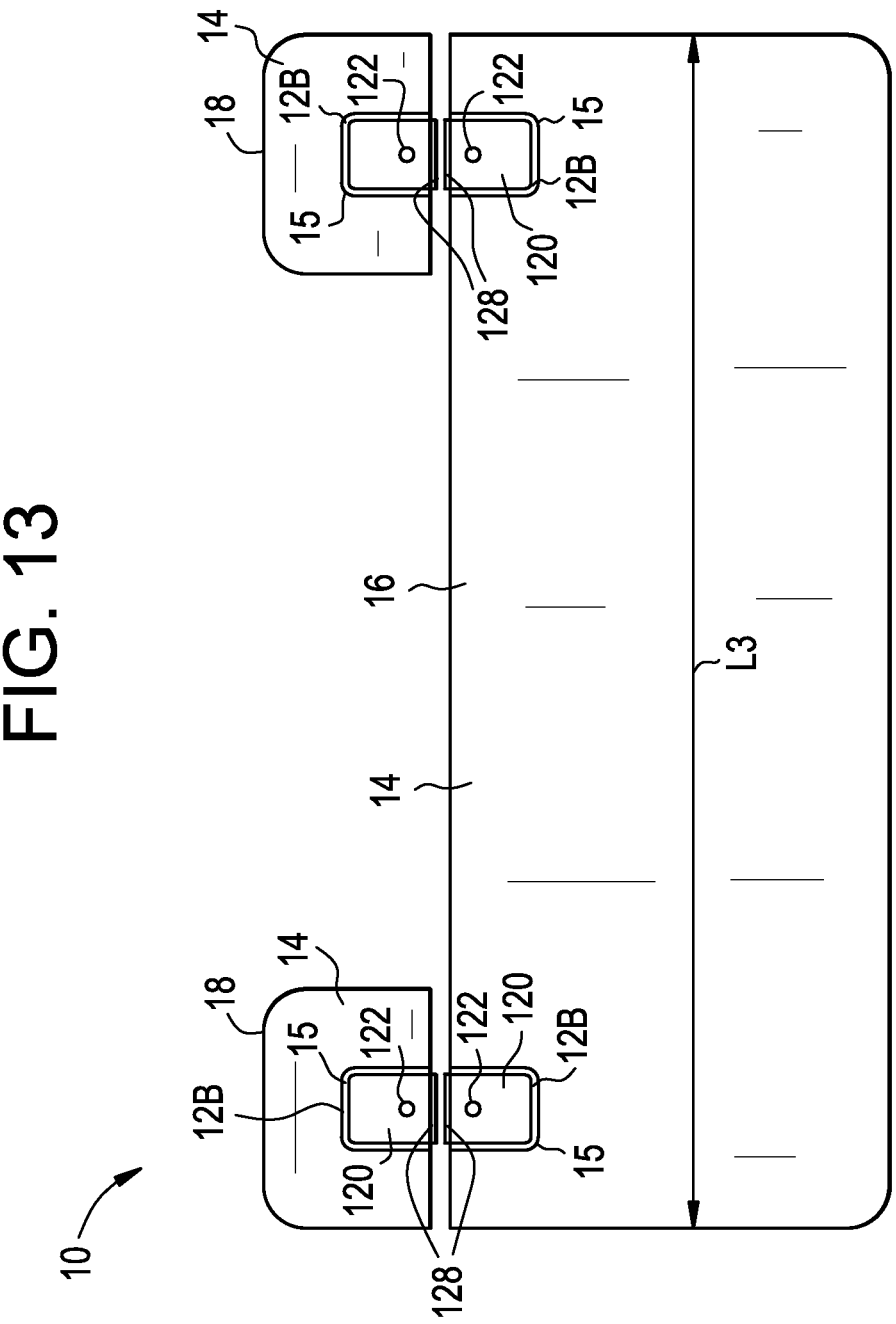
FIG. 13 provides a bottom plan view of the roofing bracket of FIG. 12.

A standing seam profile adapter 120 of the present invention is shown in FIGS. 12 and 13. One embodiment of first section 16 and second sections 18 of roofing bracket 10 (10C in FIG. 2, 10D in FIG. 6, 10E in FIG. 10A), having base 12 and pad 14 installed thereon, respectively includes profile adapter 120 releasably mounted to each bottom face 12B of each base 12. Profile adapter 120 defines a flange portion or flange 126 configured to engage an upright portion or upright 12C extending from each base 12. One embodiment for releasably mounting profile adapter 120 to each bottom face 12B includes installing a fastener 122 through an aperture 124 defined in profile adapter 120 that is received within a corresponding aperture (not shown) defined in each bottom face 12B. In one embodiment, fastener 122 comprises a threaded fastener such as a machine screw that is threadedly received within a corresponding aperture defined in each bottom face 12B. In one embodiment, each pad 14 defines a cutout 15 such that profile adapter 120 is mounted to each bottom face 12B in a counter-sunk fashion wherein contact between pad 14 and the roofing panel is maintained and contact between profile adapter 120 and the roofing panel is obstructed.

The profile adapter 120 is mounted to each bottom face 12B of each base 12 by any conventional means suited for the materials that comprise the base 12 and profile adapter 120, such as for example, use of conventional fasteners including screws, rivets and the like, and use of a suitable adhesive. The profile adapter 120 may be fabricated from a suitable metal such as, for example, steel, aluminum, and titanium. The profile adapter 120 also may be fabricated from graphite, wood, or synthetic materials.

Figure 15A:
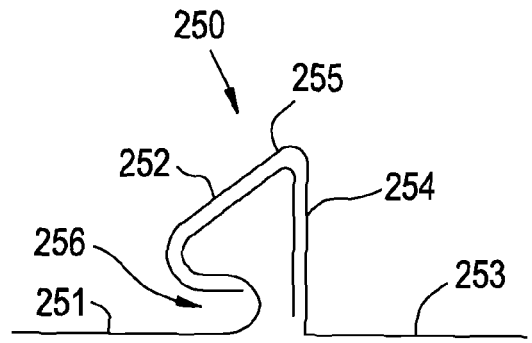
FIGS. 15A-15C provide illustrations of three profiles of a standing seam roof panel which require the use of a standing seam profile adapter.
Figure 15B:
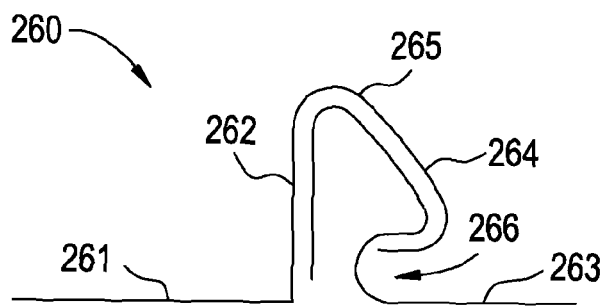
Figure 15C:
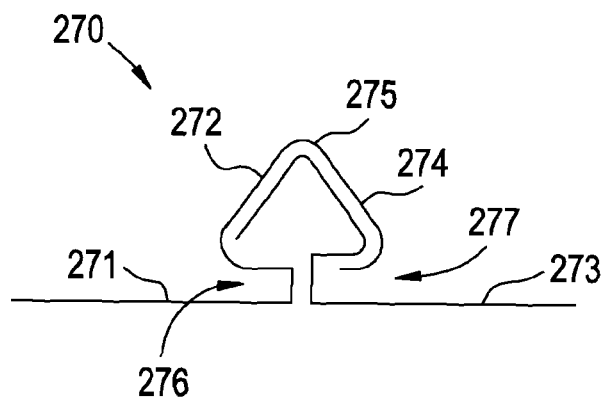

As shown in FIGS. 12 and 13, profile adapter 120 defines a mounting profile 128 configured to engage a roofing panel profile cross-section, for example, one of the embodiments of roofing panel profile cross-sections shown respectively in FIGS. 15A-15C. The standing seam itself having one or both sides that do not extend substantially vertical, or upright, and substantially parallel to one another, may not provide an adequate contact area between the first and/or second sections 16 and 18. As a result, the first and/or second sections 16 and 18 may pull away or slide off of the standing seam. Accordingly, a profile adapter 120 is selected for mounting onto first and/or second sections 16 and 18 such that mounting profile 128 of the selected profile adapter 120 extends into or underneath and engages a non-parallel profile of a standing seam. With the profile adapter 120 mounted onto first and/or second sections 16 and 18 wherein the profile adapter 120 extends into or underneath and engages a non-parallel profile of a standing seam, the first and/or second sections 16 and 18 cannot pull away or slide off of the standing seam. In addition, a plurality of selected profile adapters 120 can be mounted respectively onto first and/or second sections 16 and 18.

In one embodiment shown in FIG. 15A, a roofing material 250 defines a first piece or section 251 and a second piece or section 253 that are brought together and joined to form a standing seam 255. The standing seam defines opposite sides 252 and 254 that are not configured substantially parallel to one another. Opposite side 252 extends laterally outward and then upward at a non-orthogonal angle therefrom; and opposite side 254 extends substantially vertical. Opposite side 252 does not provide an adequate contact area for first and/or second sections 16 and 18. As a result, one of first section 16 and second sections 18 of roofing bracket 10 includes one or more profile adapters 120 mounted thereto. The selected profile adapter 120 defines a mounting profile 128 configured to engage profile 256.

In another embodiment shown in FIG. 15B, a roofing material 260 defines a first piece or section 261 and a second piece or section 263 that are brought together and joined to form a standing seam 265. The standing seam defines opposite sides 262 and 264 that are not configured substantially parallel to one another. Opposite side 262 extends substantially vertical; and opposite side 264 extends laterally outward and then upward at a non-orthogonal angle therefrom. Opposite side 264 does not provide an adequate contact area for first and/or second sections 16 and 18. As a result, one of first section 16 and second sections 18 of roofing bracket 10 includes one or more profile adapters 120 mounted thereto. The selected profile adapter 120 defines a mounting profile 128 configured to engage profile 266.

In another embodiment shown in FIG. 15C, a roofing material 270 defines a first piece or section 271 and a second piece or section 273 that are brought together and joined to form a standing seam 275. The standing seam defines opposite sides 272 and 274 that are not configured substantially parallel to one another. Opposite sides 272 and 274 extend laterally outward and then upward at a non-orthogonal angle therefrom and do not provide an adequate contact area for first and/or second sections 16 and 18. As a result, both first section 16 and second sections 18 of roofing bracket 10 include one or more profile adapters 120 mounted thereto. The selected profile adapters 120 respectively define a mounting profile 128 configured to engage profiles 276 and 277.

As further shown in FIGS. 12 and 13, mounting profile 128 of profile adapter 120 extends for a length L1 in the direction of the standing seam to which it is mounted. Similarly, second section 18 extends for a length L2 in the direction of the standing seam to which it is mounted; and first section 18 extends for a length L3 in the direction of the standing seam to which it is mounted. In one embodiment, L1 is only a portion of L2 and/or L3. In one embodiment, L1 is substantially equivalent to L2 and/or L3.

The present invention comprises an improvement to the roofing bracket apparatus and system disclosed in U.S. Pat. No. 7,568,671 entitled Roofing Bracket Apparatus and System issued on 4 Aug. 2009 to Mario Lallier, which patent is incorporated herein in its entirety. The present invention comprises advancement in the design of the PCD including advanced designs for the means for angle adjustment or radial extension of the PSS. Accordingly, a greater degree of flexibility is provided such that a generally horizontal platform may be provided for a greater degree of incline of roof. The roofing bracket of the present invention also provides a means for measuring and adjusting the pressure of the clamping mechanism exerted on the standing seam thereby providing the necessary and appropriate pressure to support the anticipated load.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A roofing bracket configured to securely and removeably attach to a standing seam of a roofing panel wherein a profile of a first opposite side of the standing seam is non-parallel with a profile of a second opposite side of the standing seam, the roofing bracket comprising:
a first section having a first section base, the first section base defining a first section base top face and a first section base bottom face;
a plurality of second sections, each of the plurality of second sections having a second section base, each second section base defining a second section base top face and a second section base bottom face;
a pressure clamping device extending between the first section and each of the plurality of second sections configured to draw together and retain the first section and the respective second section on opposite sides of the standing seam;
a plank support system selectively mountable onto the first section and configured to receive and retain a plank therein, the plank support system having a plank support face and an angle lift mechanism, the angle lift mechanism configured to place the plank in a substantially horizontal position;
a clamping adjustment mechanism mounted onto each of the plurality of second sections and configured to apply a torque to the first section and the second section to further draw together the first and second section; and
at least one standing seam profile adapter mounted to at least one of the first section base bottom face and each of the plurality of second base bottom faces, the adapter having a surface configured to engage the profile of the first opposite side of the standing seam.

2. The roofing bracket of claim 1 wherein an angle between the first section base and the plank support face is in the range of about 15° to about 75°.

3. The roofing bracket of claim 1 wherein an angle between the first section base and the plank support face is in the range of about 30° to about 60°.

4. The roofing bracket of claim 1 wherein an angle between the first section base and the plank support face is in the range of about 45°.

5. The roofing bracket of claim 1 wherein the clamping adjustment mechanism applies a torque to the first section and the second section in the range between about 20 and about 50 lbs. of torque per square foot.

6. The roofing bracket of claim 1, the pressure clamping device further comprising a locking tab configured to releasably secure the pressure clamping device in a locked configuration.

7. The roofing bracket of claim 6, the locking tab comprising:
a locking flange;
a locking clasp mounted to the pressure clamping device, the locking clasp defining at least one slot and at least one keyway; and
a locking link received within the at least one slot defined in the locking clasp, the locking link defining at least one flange extending therefrom, the at least one flange received within the at least one keyway defined in the locking clasp and defining a pivot point at a point of contact of the at least one flange with the at least one keyway, the locking link further defining a hook extending therefrom toward the first section base configured to engage a structural member of the pressure clamping device.

8. The roofing bracket of claim 6, the locking tab further comprising a spring extending between the locking clasp and the locking link.

9. The roofing bracket of claim 1 further comprising a handle assembly mounted to the plank support system.

10. The roofing bracket of claim 1, the selectively mountable plank support system further comprising:
a first lower base section fixedly mounted onto the first section; and
a second lower base section selectively mounted onto the first lower base section.

11. The roofing bracket of claim 1 wherein a profile of a first and second opposite side of the standing seam do not extend substantially vertical, the bracket further comprising:
at least one first standing seam profile adapter mounted to at least one of the first section base bottom face and each of the plurality of second base bottom faces, the first adapter having a surface configured to engage the profile of the first opposite side of the standing seam; and at least one second standing seam profile adapter mounted to the other of the first section base bottom face and each of the plurality of second base bottom faces, the second adapter having a surface configured to engage the profile of the second opposite side of the standing seam.

12. A method for providing a substantially horizontal platform on an inclined roof having to a standing seam wherein a profile of a first opposite side of the standing seam is non-parallel with a profile of a second opposite side of the standing seam, the method comprising:
- providing at least two roofing brackets, each roofing bracket having a first section, a plurality of second sections, a pressure clamping device extending between the first section and each of the plurality of second sections, a plank support system selectively mountable onto the first section and having a plank support face and an angle lift mechanism, a clamping adjustment mechanism mounted onto each of the plurality of second sections;
- mounting each roofing bracket to a standing seam of a roofing panel installed on an inclined roof in a substantially horizontal orientation therebetween, the first section and the a plurality of second sections are positioned adjacent to and on opposite sides of the standing seam;
- mounting a plank to the plank support system of each roofing bracket;
- engaging each angle lift mechanism such that an angle between a top face of the first section and the plank support face of each roofing bracket is in the range of about 15° to about 75°;
- adjusting the clamping adjustment mechanism of each of the plurality of second sections to apply a torque to the first section and the respective second sections of each roofing bracket;
- providing at least one standing seam profile adapter for each roofing bracket, the adapter having a surface configured to engage the profile of the first opposite side of the standing seam; and
- mounting the profile adapter to at least one of the first section and each of the plurality of second sections that engages the profile of the first opposite side of the standing seam.

13. The method for providing a substantially horizontal platform on an inclined roof of claim 12 further comprising engaging each angle lift mechanism such that the angle between the top face of the first section and the plank support face of each roofing bracket is in the range of about 30° to about 60°.

14. The method for providing a substantially horizontal platform on an inclined roof of claim 12 further comprising engaging each angle lift mechanism such that the angle between the top face of the first section and the plank support face of each roofing bracket is in the range of about 45°.

15. The method for providing a substantially horizontal platform on an inclined roof of claim 12 further comprising adjusting the clamping adjustment mechanism of each of the plurality of second sections to apply a torque to the first section and the respective second sections of each roofing bracket in the range between about 20 and about 50 lbs. of torque per square foot.

16. The method for providing a substantially horizontal platform on an inclined roof of claim 12 wherein a profile of a first opposite side of the standing seam and a profile of a second opposite side of the standing seam do not extend substantially vertical, the method further comprising:
- providing at least one first standing seam profile adapter mounted to at least one of the first section base bottom face and each of the plurality of second base bottom faces, the first adapter having a surface configured to engage the profile of the first opposite side of the standing seam;
- providing at least one second standing seam profile adapter mounted to the other of the first section base bottom face and each of the plurality of second base bottom faces, the second adapter having a surface configured to engage the profile of the second opposite side of the standing seam;
- mounting the at least one first profile adapter to at least one of the first section and each of the plurality of second sections that engages the profile of the first opposite side of the standing seam; and
- mounting the at least one second profile adapter to at least one of the first section and each of the plurality of second sections that engages the profile of the second opposite side of the standing seam.

17. The method for providing a substantially horizontal platform on an inclined roof of claim 12, wherein providing at least two roofing brackets, each roofing bracket having a plank support system, further comprises:
- providing a first lower base section fixedly mounted onto the first section of each roofing bracket; and
- providing a second lower base section and selectively mounting the second lower base section onto the first lower base section.

* * * * *